No. 878,714. PATENTED FEB. 11, 1908.
H. T. DUNBAR.
SPRING WHEEL.
APPLICATION FILED FEB. 11, 1907.

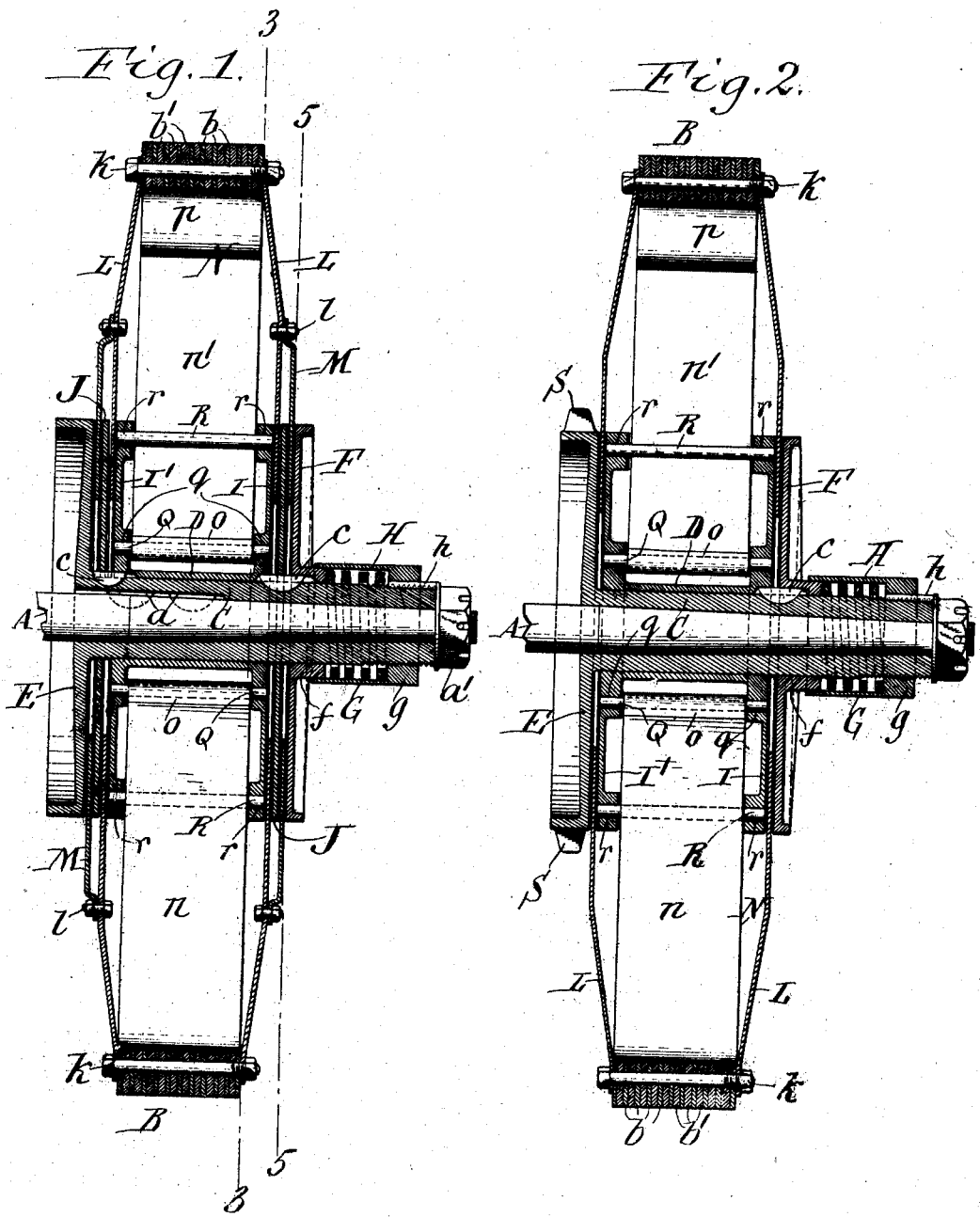

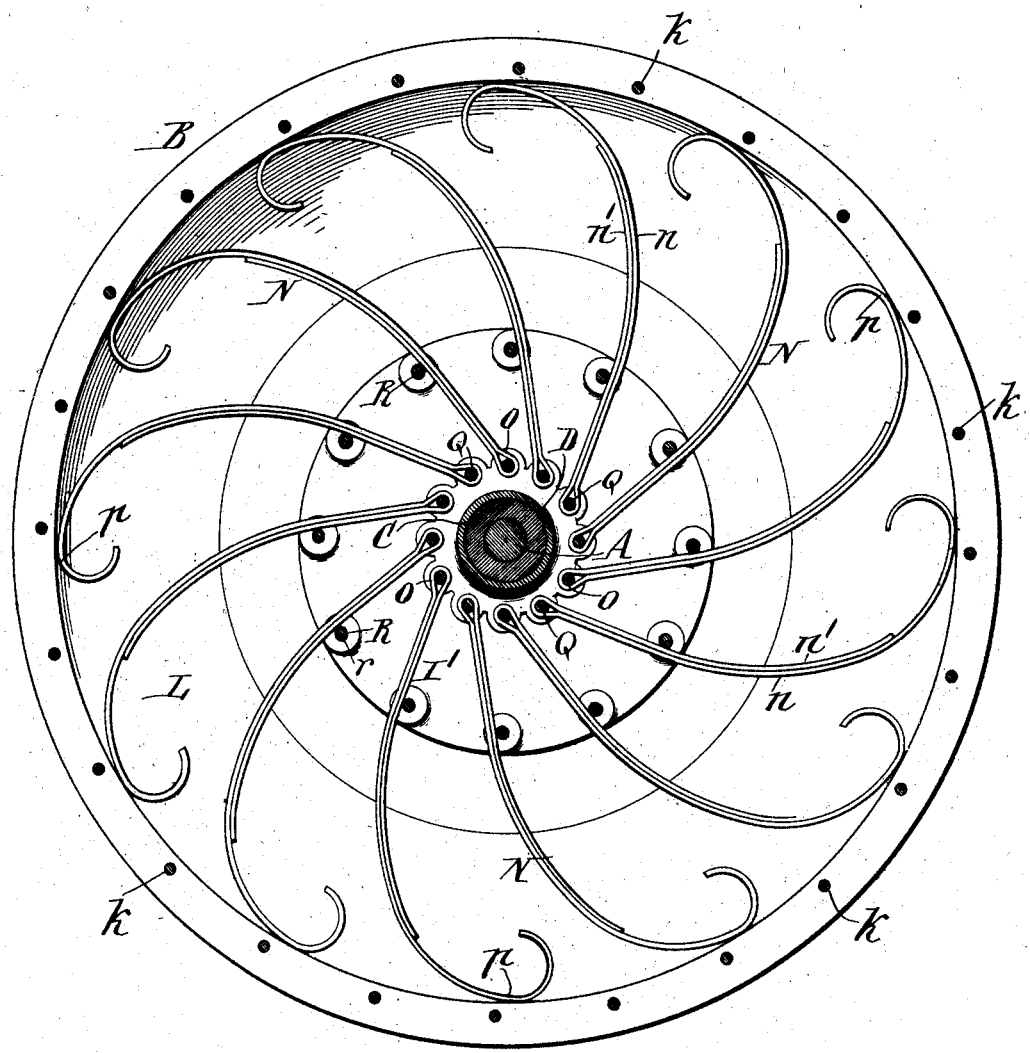

3 SHEETS—SHEET 3.

Witnesses:
Richard Sommer
Gustav W. Hora

Inventor
Harris T. Dunbar
by Geyer & Popp
Attorneys.

UNITED STATES PATENT OFFICE.

HARRIS T. DUNBAR, OF BUFFALO, NEW YORK.

SPRING-WHEEL.

No. 878,714.  Specification of Letters Patent.  Patented Feb. 11, 1908.

Application filed February 11, 1907. Serial No. 356,724.

*To all whom it may concern:*

Be it known that I, HARRIS T. DUNBAR, a citizen of the United States, residing at Buffalo, in the county of Erie and State of New York, have invented a new and useful Improvement in Spring-Wheels, of which the following is a specification.

This invention relates to a spring wheel which is more particularly designed for use in automobiles.

The object of this invention is to produce a wheel of this character which permits of dispensing with the differential gearing usually employed in automobiles, which yieldingly connects the hub and rim of the wheel in such manner so as to cushion these parts relatively to each other and still maintain a reliable driving connection between the same and which is so constructed that it operates to prevent any sudden bodily shifting of the hub and rim relatively to each other and thus absorbs the shocks which occur when the wheel drops into a depression or runs against an obstruction.

Figure 4:
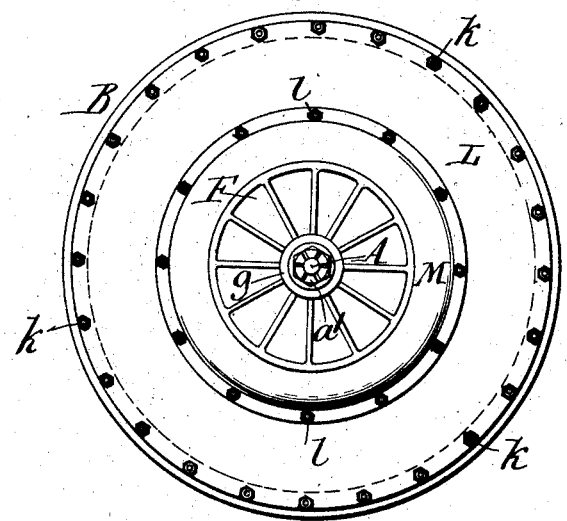
Figure 5:
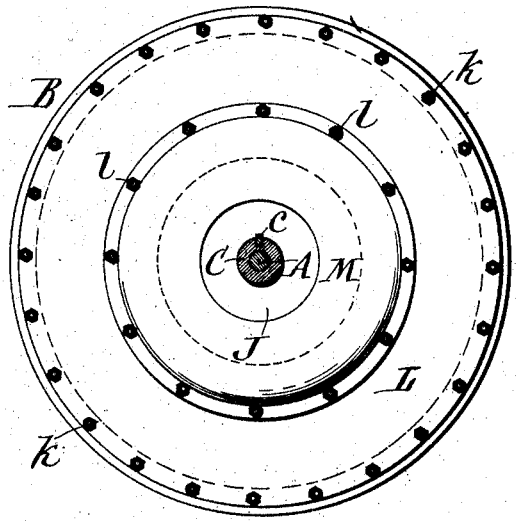

In the accompanying drawings consisting of 3 sheets: Figure 1 is a sectional view of the wheel taken lengthwise to the axle and showing one embodiment of my invention. Fig. 2 is a similar section showing another form of spring wheel constructed in accordance with my invention. Fig. 3 is a transverse section in line 3—3, Fig. 1. Fig. 4 is a side elevation, on a reduced scale, of the wheel shown in Fig. 1. Fig. 5 is a cross section of the same, on a reduced scale, in line 5—5, Fig. 1.

Similar letters of reference indicate corresponding parts throughout the several views.

A represents the axle of the automobile and B the rim of the spring wheel. On the end of the axle is mounted the hub of the spring wheel which is so constructed as to form part of a frictional driving connection between the same and the rim of the wheel. The form of hub shown in Figs. 1, 3, 4 and 5 is constructed as follows:

C represents an inner hub section or sleeve mounted on the axle in any suitable manner and D an outer hub section or sleeve surrounding the inner hub section and connected therewith by splines $c$, $c$ or otherwise so as to compel the two hub sections to turn together but permit the same to move lengthwise relatively to each other.

As shown in Fig. 1, the bore of the inner tube section is made conical and the end portion of the axle which receives the same is of corresponding conical formation. The inner hub section is rigidly secured to the axle by means of keys $a$ arranged between the conical surfaces thereof and a fastening screw nut $a^1$ arranged at the outer end of the axle and bearing against the outer end of the inner hub section. At the rear end of the inner hub section the same is provided with a rear outer friction disk E which may be formed integrally therewith, as shown in Fig. 1, or made separate and rigidly attached thereto.

On the front end of the inner hub section is mounted a front outer friction disk F which is capable of axial movement thereon but compelled to turn therewith, preferably by means of the front spline $c$ which is made long enough for this purpose. The front friction disk F is constantly moved toward the fixed rear disk of the inner hub section by means of a yielding tension device which may be variously constructed, that shown in Fig. 1 consisting of a spiral spring G surrounding the front part of the inner hub section and bearing at its rear end against an annular hub flange $f$ on the front disk F while its front end bears against a screw nut $g$ on the front end of the inner hub section. For the purpose of concealing this spring and excluding water and dirt therefrom the same is inclosed by a cylindrical hood H which preferably connects at its front or outer end with the screw nut $g$ and overlaps the hub flange $f$ of the front outer friction disk at its opposite end. Upon turning the screw nut $g$ in one direction or the other the tension of the spring G may be adjusted as required and after adjustment this nut is held against displacement by means of a longitudinal key $h$ placed between the same and the inner hub section.

At opposite ends of the outer hub section the same is provided with front and rear inner friction disks I, $I^1$ which may be formed integrally therewith, as shown, or made separate and rigidly connected therewith. Between each inner friction disk and the adjacent outer friction disk is arranged an intermediate friction disk J which is connected by the adjacent spline $c$ with the inner and outer hub sections so as to be compelled to turn therewith but be free to move axially relatively thereto.

The rim of the wheel may be of any suitable construction. As shown in Fig. 1, the same consists of alternate rings of steel $b$ and raw hide or wood $b^1$ which are rigidly secured together by means of an annular row of clamping bolts $k$. Arranged on opposite sides of the rim are two main friction webs L, L which are preferably constructed of sheet steel or similar material in the form of dished rings. The outer edges or marginal portions of these webs are secured to opposite sides of the wheel rim, preferably by the bolts $k$ and the inner edge of each of these webs is arranged between one of the inner friction disks and the opposing side of the adjacent intermediate friction disk.

On the outer side of each main web is arranged an auxiliary friction web M of ring form but smaller in diameter than the companion main web. This auxiliary web is secured at its outer edge to the companion main web by means of bolts 1, as shown or otherwise, so as to compel these webs to rotate together. At its inner edge the auxiliary friction web is arranged between one of the outer friction disks and the opposing side of the adjacent intermediate friction disk. It will thus be observed that by this relative arrangement of the friction disks of the hub and the friction webs of the rim, the pressure of the spring G will cause the same to be pressed together and produce a frictional connection between the disks and webs. This frictional connection is so determined that it is sufficient to transmit the rotary movement of the hub to the rim under normal conditions but will permit the webs and friction disks to slip on each other under abnormal conditions. The first mentioned condition usually exists when the automobile is running straight while the last mentioned condition exists when the automobile is turning a corner and one of the driving wheels of the automobile rotates faster than the other. This frictional connection between the hub and rim of the wheel therefore answers the same purpose as the differential gearing which is usually employed between the two driving wheels of automobiles and permits of dispensing with such gearing.

If desired the number of intermediate friction disks and auxiliary friction webs may be increased or the same may be omitted altogether in which latter case the outer friction disks will be engaged directly with the other sides of the main webs, as shown in Fig. 2. This last mentioned construction is suitable for wheels of automobiles which are of comparatively light weight while the construction shown in Fig. 1, having a more extensive frictional contact, is intended for heavier automobiles. The rim of the wheel is yieldingly held in a central or concentric position relatively to the hub by a spring or cushion device which is so constructed as to permit the hub and rim to shift their centers relatively to each other under varying loads and conditions and thus relieve the jar upon the automobile and the passengers. Various yielding means may be employed for this purpose that shown in the drawings, as an example, being constructed as follows: N represents a plurality of curved springs which are arranged substantially tangential and secured at their inner ends to the hub while their outer ends operate on the wheel rim. These springs are so arranged that their inner ends are arranged at the front and their outer ends at the rear relatively to the direction in which the wheel is rotated. Each of these springs preferably consists of a long front leaf $n$ and a short leaf $n^1$, the inner ends of these leaves being connected by an eye or loop $o$ while the front leaf extends outwardly beyond the rear leaf and terminates in a rounded portion, curl or shoe $p$ which engages frictionally with the inner side of the wheel rim. The inner portions of the several leaf springs are arranged between the two inner friction disks of the outer hub section and are connected with the same by an annular row of connecting pins Q which are arranged parallel with the axis of the hub and each of which passes through the eye of one pair of leaves and is seated at opposite ends in openings $q$ formed in the inner friction disks near the axis thereof. Each pair of spring leaves are also supported between their inner and outer ends by means of a pin R arranged parallel with the axis of the hub and engaging with the rear side of the rear leaf of the respective pair while its opposite ends are seated in openings $r$, $r$ formed in the inner friction disks adjacent to the periphery thereof. When the load is placed upon the axle and hub the lower springs of the wheel are strained or deflected and as the wheel rotates the several springs upon passing below the hub are successively strained in an obvious manner. It is of course understood that the central openings in the friction webs are of such diameter that sufficient clearance is provided between the same and the inner hub section to permit the requisite radial movement of these parts relatively to each other under the greatest load which the wheel is likely to carry. Inasmuch as the friction disks constantly grip the friction webs, the frictional contact between these parts yieldingly resists any radial movement of the hub and rim relatively to each other both when the hub moves away from the center of the wheel rim and back again, thereby operating to prevent any sudden movements of these parts relatively to each other and absorbing or modifying the shock which occurs when the rim of the wheel drops into an opening or strikes an obstruction in the road way.

When the hub and wheel rim rotate differentially at any time, as for instance, when the rim of one driving wheel of the automobile turns faster than that of the outer wheel while turning a corner, the springs within one wheel rim slip on the inner side of the same. In order to reduce the wear between the outer ends of the springs and the wheel rim during this sliding movement the co-operating surfaces thereof may be oiled or lubricated in any suitable manner. If at any time the wheel rim should be moved backwardly relatively to the hub as might possibly occur when backing up the automobile, each spring will be simply swung forwardly from the outer pin R which normally supports the same on its rear side until it bears against the outer supporting pin R of the next forward spring without materially effecting the operation of the same.

It is immaterial how the power is transmitted to the hub of the wheel. When the hub is secured directly to the axle, as shown in Fig. 1, the power may be applied to the latter. But if desired the power may be applied directly to the hub, for instance, by means of the driving chain passing around sprocket teeth S on the rear outer friction disk, as shown in Fig. 2. When the power is applied directly to the hub in the manner last described, the hub may be mounted loosely on the axle instead of being secured thereto, as shown in Fig. 2.

It will be observed that owing to the frictional connection between the hub and rim of my improved wheel no shearing action on any of the parts due to rotary strains is possible inasmuch as the parts slip on one another and yield as much as is necessary to compensate for any unusual or excessive strain while at the same time furnishing a sufficiently reliable driving connection between the hub and rim to answer all practical purposes.

I claim as my invention:

1. A spring wheel comprising a hub, a rim, yielding means operating to hold the rim concentric to said hub, and a frictional connection between said hub and rim independent of said yielding means, substantially as set forth.

2. A spring wheel comprising a hub having friction disks, a rim having webs arranged between said disks, means for pressing said disks and webs together, and yielding means operating to hold the rim concentric to said hub, substantially as set forth.

3. A spring wheel comprising a hub having friction disks, a rim having webs arranged between said disks, a spring operating to press said disks and webs together, and springs operating to hold the rim concentric to said hub, substantially as set forth.

4. A spring wheel comprising a hub composed of an inner section and an outer section, a fixed outer friction disk arranged at one end of the inner hub section, an axially movable outer friction disk arranged on the opposite end of the inner hub section, inner friction disks arranged at opposite ends of the outer hub section, a rim, friction webs connected with said rim and arranged between said disks, a spring operating to press said friction disks and webs together, and springs operating to hold said rim concentric to said hub, substantially as set forth.

5. A spring wheel comprising a hub composed of an inner section and an outer section, a fixed outer friction disk arranged at one end of the inner hub section, an axially movable outer friction disk arranged on the opposite end of the inner hub section, inner friction disks arranged at opposite ends of the outer hub section, a spline operating to cause said inner and outer hub sections and the movable outer disk to turn together, a rim, friction webs connected with said rim and arranged between said disks, a spring operating to press said friction disks and webs together, and springs operating to hold said rim concentric to said hub, substantially as set forth.

6. A spring wheel comprising a hub composed of an inner section and an outer section, a fixed outer friction disk arranged at one end of the inner hub section, an axially movable outer friction disk arranged on the opposite end of the inner hub section, inner friction disks arranged at opposite ends of the outer hub section, a rim, friction webs connected with said rim and arranged between said disks, a screw nut arranged on the inner hub section, a spring surrounding the inner hub section and bearing at its opposite ends against said screw nut and said axially movable outer disk, and springs operating to hold said rim concentric to said hub, substantially as set forth.

7. A spring wheel comprising a hub composed of an inner section and an outer section, a fixed outer friction disk arranged at one end of the inner hub section, an axially movable outer friction disk arranged on the opposite end of the inner hub section, inner friction disks arranged at opposite ends of the outer hub section, a rim, friction webs connected with said rim and arranged between said disks, a screw nut arranged on the inner hub section, a spring surrounding the inner hub section and bearing at its opposite ends against said screw nut and said axially movable outer disk, a hood secured to said nut and inclosing said spring, and springs operating to hold said rim concentric to said hub, substantially as set forth.

8. A spring wheel comprising a hub composed of an inner section and an outer section, a fixed outer friction disk arranged at one end of the inner hub section, an axially movable outer friction disk arranged on the opposite end of the inner hub section, inner friction disks arranged at opposite ends of the outer hub section, intermediate friction disks arranged between the inner and outer friction disks, a rim, main friction webs connected with the rim and each arranged between one of said inner friction disks and the adjacent intermediate friction disk, auxiliary friction webs each connected with one of the main webs and arranged between one of the outer friction disks and the adjacent intermediate friction disk, a spring operating to press said disks and webs together, and springs operating to hold said rim concentric to said hub, substantially as set forth.

9. A spring wheel comprising a hub, a rim, means constructed to frictionally connect said hub and rim, and rim centering springs secured at the inner ends to the hub and engaging slidingly at their outer ends with said rim, substantially as set forth.

10. A spring wheel comprising a hub, a rim, means constructed to frictionally connect said hub and rim, and rim centering springs each constructed of leaf form and attached at its inner end to the hub and bearing slidingly at its outer end against the rim, substantially as set forth.

11. A spring wheel comprising a hub having an inner section and an outer section, outer friction disks arranged on the inner section, inner friction disks arranged on the outer section, a rim, friction webs connected with said rim and arranged between the friction disks, a spring for pressing together said disks and webs, an annular row of rim centering springs each consisting of a rear leaf, a front leaf having a curved outer end bearing against the rim and an eye connecting the inner ends of the front and rear leaves, a pin arranged in each of said eyes and supported at opposite ends on the inner friction disks, and means for supporting said centering springs between their inner and outer ends, substantially as set forth.

12. A spring wheel comprising a hub having an inner section and an outer section, outer friction disks arranged on the inner section, inner friction disks arranged on the outer section, a rim, friction webs connected with said rim and arranged between the friction disks, a spring for pressing together said disks and webs, an annular row of rim centering springs each consisting of a rear leaf, a front leaf having a curved outer end bearing against the rim and an eye connecting the inner ends of the front and rear leaves, a pin arranged in each of said eyes and supported at opposite ends on the inner friction disks, and means for supporting said centering springs between their inner and outer ends, consisting of a pin engaging with the rear side of each rear leaf and supported at its ends on said inner friction disks, substantially as set forth.

Witness my hand this 7th day of February, 1907.

HARRIS T. DUNBAR.

Witnesses:
THEO. L. POPP,
E. M. GRAHAM.